United States Patent
Ha et al.

(10) Patent No.: US 12,531,110 B2
(45) Date of Patent: Jan. 20, 2026

(54) SYNCHRONOUS INDEPENDENT PLANE READ OPERATION

(71) Applicant: Intel NDTM US LLC, Santa Clara, CA (US)

(72) Inventors: Chang Wan Ha, San Ramon, CA (US); Binh Ngo, Folsom, CA (US); Ali Khakifirooz, Brookline, MA (US); Aliasgar S. Madraswala, Folsom, CA (US); Bharat Pathak, Folsom, CA (US); Pranav Kalavade, San Jose, CA (US); Shantanu Rajwade, Santa Clara, CA (US)

(73) Assignee: Intel NDTM US LLC, Santa Clara, CA (US)

( * ) Notice: Subject to any disclaimer, the term of this patent is extended or adjusted under 35 U.S.C. 154(b) by 767 days.

(21) Appl. No.: 17/707,349

(22) Filed: Mar. 29, 2022

(65) Prior Publication Data

US 2023/0317144 A1   Oct. 5, 2023

(51) Int. Cl.
| | |
|---|---|
| *G11C 11/4096* | (2006.01) |
| *G11C 5/14* | (2006.01) |
| *G11C 11/4074* | (2006.01) |
| *G11C 11/4076* | (2006.01) |

(52) U.S. Cl.
CPC .......... *G11C 11/4096* (2013.01); *G11C 5/145* (2013.01); *G11C 11/4074* (2013.01); *G11C 11/4076* (2013.01)

(58) Field of Classification Search
CPC . G11C 11/4096; G11C 5/145; G11C 11/4074; G11C 11/4076; G11C 16/30; G11C 16/32; G11C 16/0483; G11C 16/08; G11C 7/1039; G11C 16/26
See application file for complete search history.

(56) References Cited

U.S. PATENT DOCUMENTS

| | | | | |
|---|---|---|---|---|
| 8,508,998 | B2 * | 8/2013 | Haukness | G06F 12/0246 365/185.11 |
| 10,877,696 | B2 * | 12/2020 | Wakchaure | G11C 16/0483 |
| 11,354,067 | B2 * | 6/2022 | Kavalipurapu | G06F 3/0604 |
| 11,429,300 | B2 * | 8/2022 | Pekney | G06F 3/0604 |
| 2019/0227749 | A1 | 7/2019 | Wakchaure et al. | |

OTHER PUBLICATIONS

Khakifirooz, A., et al., "A 1Tb 4b/Cell 144-Tier Floating-Gate 3D-Nand Flash Memory with 40 MB/s Program Throughput and 13.8 GB/mm Bit Density", IEEE International Solid-State Circuits Conference (ISSCC 2021); Session 30; Non-Volatile Memories; 30.2; Feb. 18, 2021.

* cited by examiner

*Primary Examiner* — Jerome Leboeuf
*Assistant Examiner* — Christopher Lane Reece
(74) *Attorney, Agent, or Firm* — Morgan, Lewis & Bockius LLP

(57) ABSTRACT

An embodiment of an apparatus may include NAND memory organized as two or more memory planes and a controller communicatively coupled to the NAND memory, the controller including circuitry to provide synchronous independent plane read operations for the two or more memory planes of the NAND memory. Other embodiments are disclosed and claimed.

20 Claims, 8 Drawing Sheets

SYNCHRONOUS INDEPENDENT PLANE READ OPERATION

BACKGROUND

Some 3D NAND memory devices may support independent multi-plane commands In one example, the 3D NAND memory device includes 3D NAND dies, each die including multiple planes of memory cells. The device includes input/output (I/O) circuitry to receive multiple commands from a host, each of the received commands to access one of the planes. The device includes logic (which can be implemented with, for example, an ASIC controller, firmware, or both) to queue the commands in separate queues for each of the planes based on a target plane of each of the commands The logic issues the commands to their target planes independent of other planes' status, and tracks completion status of the commands independently for each plane.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
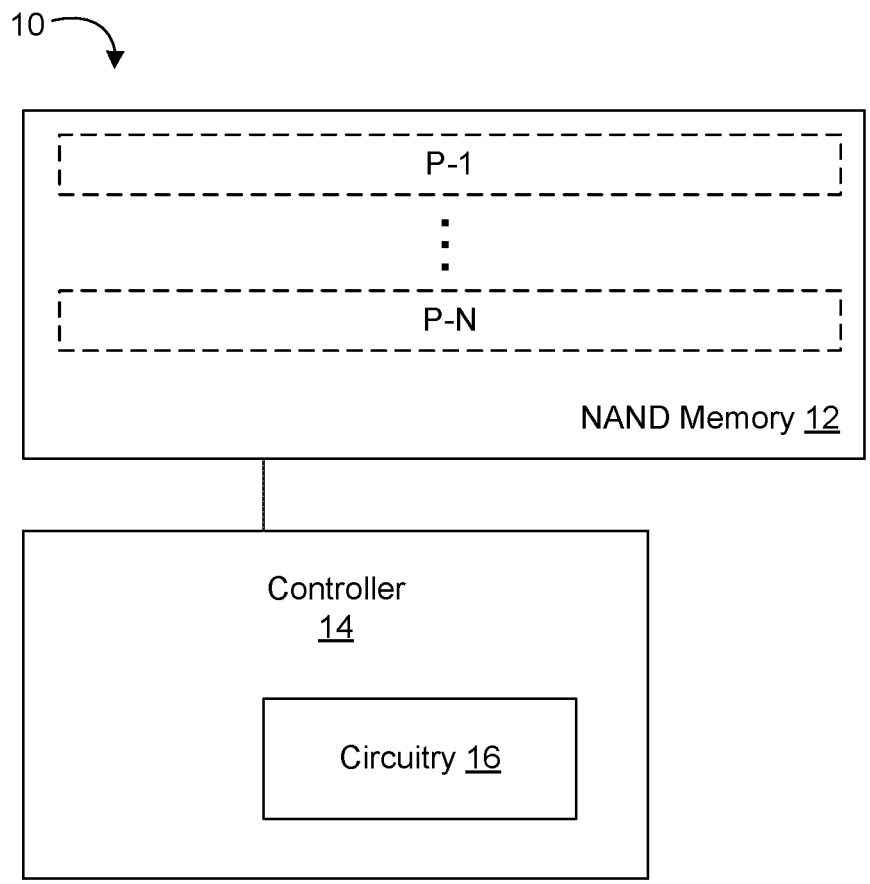
FIG. 1 is a block diagram of an apparatus according to an embodiment.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, Field Programmable Gate Array (FPGA), firmware, driver, software, or any combination thereof. The material disclosed herein may also be implemented as instructions stored on a machine-readable medium, which may be read and executed by Moore Machine, Mealy Machine, and/or one or more processors. A machine-readable medium may include any medium and/or mechanism for storing or transmitting information in a form readable by a machine (e.g., a computing device). For example, a machine-readable medium may include read only memory (ROM); random access memory (RAM); Dynamic random-access memory (DRAM), magnetic disk storage media; optical storage media; nonvolatile (NV) memory devices; qubit solid-state quantum memory, electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

NV memory (NVM) may be a storage medium that does not require power to maintain the state of data stored by the medium. In one embodiment, the memory device may include a three-dimensional (3D) NAND device. The memory device may refer to the die itself and/or to a packaged memory product. In particular embodiments, a memory component with non-volatile memory may comply with one or more standards promulgated by the JEDEC, or other suitable standard (the JEDEC standards cited herein are available at jedec.org).

In some 3D NAND memory devices, asynchronous full independent multi-plane read operations may involve the independent execution of read operation in each plane. Sense related circuits and power supply circuits connected to sense circuits need to be separated to not interfere each plane's read operation. A problem is that the sense related circuits and power supply circuits occupy a significant die area of the memory device. Some embodiments may provide technology for synchronous independent plane read operation. Advantageously, some embodiments may provide a higher density for a given die size (e.g., or a smaller die size for a given density) and may further provide a higher terabyte (TB) outcome per wafer.

With reference to FIG. 1, an embodiment of an apparatus 10 may include NAND memory 12 organized as two or more memory planes (e.g., memory plane P-1 through P-N, where N>1), and a controller 14 communicatively coupled to the NAND memory 12. The controller 14 may include circuitry 16 to provide synchronous independent plane read operations for the two or more memory planes of the NAND memory 12. In some embodiments, the circuitry 16 may be configured to perform a sense read operation on a first plane of the two or more memory planes of the NAND memory 12, and to delay a subsequent sense read operation on a second plane of the two or more memory planes of the NAND memory 12 if the sense read operation is in progress on the first plane. For example, the circuitry 16 may be configured to delay the subsequent sense read operation on the second plane to align the subsequent sense read operation with a next read operation on the first plane after the sense read operation on the first plane is completed. In some embodiments, the circuitry may be additionally or alternatively configured to perform a pre-read operation on the second plane of the two or more memory planes of the NAND memory 12 in response to a page read command for the second plane, and to delay the subsequent sense read operation on the second plane for a period of time after the pre-read operation that aligns the subsequent sense read operation on the second plane with a next read of operation on the first plane if the sense read operation on the first place is in progress on the first plane after the pre-read operation on the second plane is completed.

In some embodiments, the apparatus 10 may further include one or more of a single charge pump circuit shared between at least two memory planes of the two or more memory planes of the NAND memory 12, a single voltage regulator circuit shared between at least two memory planes of the two or more memory planes of the NAND memory 12, a single power plane coupled to at least a first page buffer of a first memory plane of the two or more memory planes of the NAND memory 12 and a second page buffer of a second memory plane of the two or more memory planes of the NAND memory 12, and a single ground plane coupled to at least a first page buffer of a first memory plane of the two or more memory planes of the NAND memory 12 and a second page buffer of a second memory plane of the two or more memory planes of the NAND memory 12. In any of the embodiments herein, the NAND memory 12 may comprise 3D NAND memory cells (e.g., strings of floating gate NAND memory cells, strings of charge trap flash (CTF) NAND memory cells, etc.).

Embodiments of the controller 14 may include a general purpose controller, a special purpose controller, a memory controller, a storage controller, a micro-controller, an execution unit, etc. In some embodiments, the NAND memory 12, the circuitry 16, and/or other system memory may be located in, or co-located with, various components, including the controller 14 (e.g., on a same die or package substrate). For example, the controller 14 may be configured as a memory controller and the NAND memory 12 may be a connected memory device such as a memory module, a nonvolatile dual-inline memory module (NVDIMM), a solid-state drive (SSD), a memory node, etc.

Embodiments of each of the above controller 14, NAND memory 12, circuitry 16, and other apparatus components may be implemented in hardware, software, or any suitable combination thereof. For example, hardware implementations may include configurable logic, fixed-functionality logic, or any combination thereof. Examples of configurable logic include suitably configured programmable logic arrays (PLAs), FPGAs, complex programmable logic devices (CPLDs), and general purpose microprocessors. Examples of fixed-functionality logic include suitably configured application specific integrated circuits (ASICs), combinational logic circuits, and sequential logic circuits. The configurable or fixed-functionality logic can be implemented with complementary metal oxide semiconductor (CMOS) logic circuits, transistor-transistor logic (TTL) logic circuits, or other circuits.

For example, the circuitry 16 may be implemented on a semiconductor apparatus, which may include one or more substrates, with the circuitry 16 coupled to the one or more substrates. In some embodiments, the circuitry 16 may be at least partly implemented in one or more of configurable logic and fixed-functionality hardware logic on semiconductor substrate(s) (e.g., silicon, sapphire, gallium-arsenide, etc.). For example, the circuitry 16 may include a transistor array and/or other integrated circuit components coupled to the substrate(s) with transistor channel regions that are positioned within the substrate(s). The interface between the circuitry 16 and the substrate(s) may not be an abrupt junction. The circuitry 16 may also be considered to include an epitaxial layer that is grown on an initial wafer of the substrate(s).

Alternatively, or additionally, all or portions of these components may be implemented in one or more modules as a set of logic instructions stored in a machine- or computer-readable storage medium such as RAM, ROM, programmable ROM (PROM), firmware, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C#, VHDL, Verilog, System C or the like and conventional procedural programming languages, such as the "C" programming language or similar programming languages. For example, the NVM 12, other persistent storage media, or other system memory may store a set of instructions (e.g., which may be firmware instructions) which when executed by the controller 14 cause the apparatus 10 to implement one or more components, features, or aspects of the apparatus 10 (e.g., controlling access to the NAND memory 12, providing synchronous independent plane read operations for the two or more memory planes of the NAND memory 12, etc.).

Figure 2:
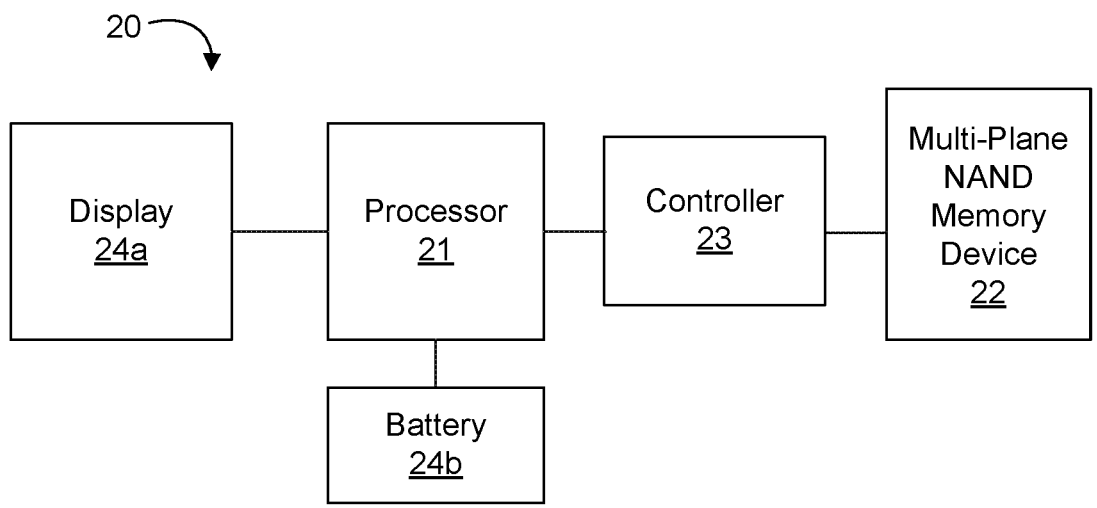
FIG. 2 is a block diagram of a system according to an embodiment.

With reference to FIG. 2, an embodiment of a system 20 may include a processor 21, a multi-plane NAND memory device 22, and a controller 23 communicatively coupled to the processor 21 and the multi-plane NAND memory device 22. For example, the multi-plane NAND memory device 22 and/or the controller 23 may include one or more features or aspects of the embodiments described herein. In particular, the controller 23 may include circuitry to provide synchronous independent plane read operations for the multi-plane NAND memory device. In some embodiments, the circuitry of the controller 23 may be configured to perform a sense read operation on a first plane of the multi-plane NAND memory device 22, and delay a subsequent sense read operation on a second plane of the multi-plane NAND memory device 22 if the sense read operation is in progress on the first plane. For example, the circuitry of the controller 23 may be configured to delay the subsequent sense read operation on the second plane to align the subsequent sense read operation with a next read operation on the first plane after the sense read operation on the first plane is completed. In some embodiments, the circuitry of the controller 23 may be additionally or alternatively configured to perform a pre-read operation on the second plane of the multi-plane NAND memory device 22 in response to a page read command for the second plane, and to delay the subsequent sense read operation on the second plane for a period of time after the pre-read operation that aligns the subsequent sense read operation on the second plane with a next read of operation on the first plane if the sense read operation on the first place is in progress on the first plane after the pre-read operation on the second plane is completed.

In some embodiments, the multi-plane NAND memory device 22 may further include one or more of a single charge pump circuit shared between at least two memory planes of the multi-plane NAND memory device 22, a single voltage regulator circuit shared between at least two memory planes of the multi-plane NAND memory device 22, a single power plane coupled to at least a first page buffer of a first memory plane of the multi-plane NAND memory device 22 and a second page buffer of a second memory plane of the multi-plane NAND memory device 22, and a single ground plane coupled to at least a first page buffer of a first memory plane of the multi-plane NAND memory device 22 and a second page buffer of a second memory plane of the multi-plane NAND memory device 22.

For example, the multi-plane NAND memory device 22 may comprise 3D NAND memory cells, such as floating gate NAND memory cells, CTF NAND memory cells. etc. In some embodiments, the system 20 may comprise a mobile computing device and may include any of a number of connected devices, peripherals, and/or components, such as at least one of a display 24a communicatively coupled to the processor 21, and a battery 24b coupled to the processor 21, etc.

For example, the controller 23 may be configured as a memory controller. For example, the multi-plane NAND memory device 22 may be a connected memory device (e.g., a memory module, NVDIMM, a SSD, a memory node, etc.). Embodiments of the circuitry of the controller 23 may be implemented in a system, apparatus, computer, device, etc., for example, such as those described herein. More particularly, hardware implementations may include configurable logic (e.g., suitably configured PLAs, FPGAs, CPLDs, general purpose microprocessors, etc.), fixed-functionality logic (e.g., suitably configured ASICs, combinational logic circuits, sequential logic circuits, etc.), or any combination thereof. Alternatively, or additionally, the circuitry of the controller 23 may be implemented in one or more modules as a set of logic instructions stored in a machine- or computer-readable storage medium such as RAM, ROM, PROM, firmware, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C#, VHDL, Verilog, System C or the like and conventional procedural programming languages, such as the "C" programming language or similar programming languages.

Figure 3A:
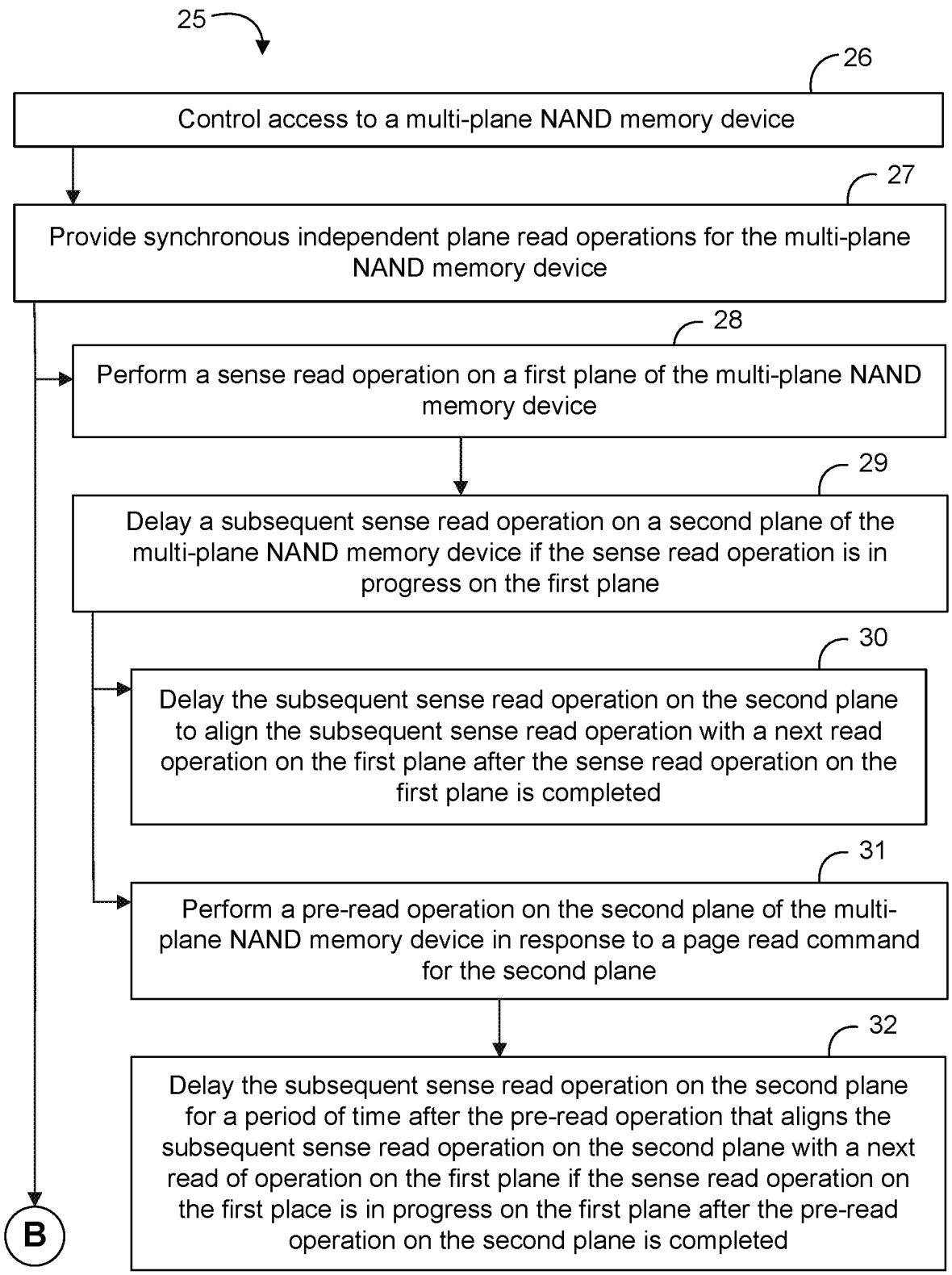
FIGS. 3A to 3B are illustrative diagrams of an example of a method according to an embodiment.
Figure 3B:
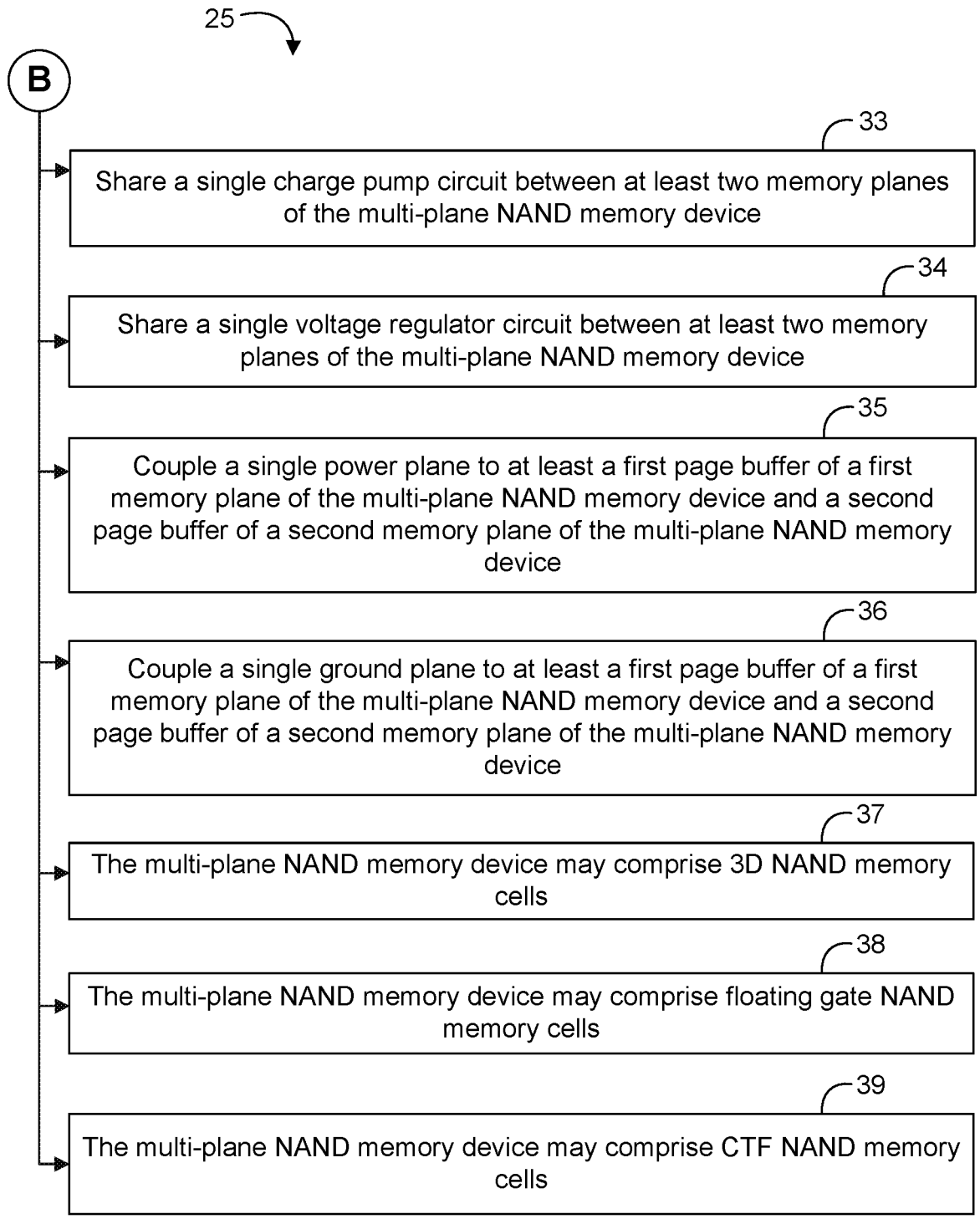

With reference to FIGS. 3A to 3B, an embodiment of a method 25 may include controlling access to a multi-plane NAND memory device at box 26, and providing synchronous independent plane read operations for the multi-plane NAND memory device at box 27. Some embodiments of the method 25 may include performing a sense read operation on a first plane of the multi-plane NAND memory device at box 28, and delaying a subsequent sense read operation on a second plane of the multi-plane NAND memory device if the sense read operation is in progress on the first plane at box 29. For example, the method 25 may include delaying the subsequent sense read operation on the second plane to align the subsequent sense read operation with a next read operation on the first plane after the sense read operation on the first plane is completed at box 30. Additionally, or alternatively, the method 25 may include performing a pre-read operation on the second plane of the multi-plane NAND memory device in response to a page read command for the second plane at box 31, and delaying the subsequent sense read operation on the second plane for a period of time after the pre-read operation that aligns the subsequent sense read operation on the second plane with a next read of operation on the first plane if the sense read operation on the first place is in progress on the first plane after the pre-read operation on the second plane is completed at box 32.

Some embodiments of the method 25 may further include one or more of sharing a single charge pump circuit between at least two memory planes of the multi-plane NAND memory device at box 33, sharing a single voltage regulator circuit between at least two memory planes of the multi-plane NAND memory device at box 34, coupling a single power plane to at least a first page buffer of a first memory plane of the multi-plane NAND memory device and a second page buffer of a second memory plane of the multi-plane NAND memory device at box 35, and coupling a single ground plane to at least a first page buffer of a first memory plane of the multi-plane NAND memory device and a second page buffer of a second memory plane of the multi-plane NAND memory device at box 36.

In some embodiments, the multi-plane NAND memory device may comprise 3D NAND memory cells at box 37. For example, the multi-plane NAND memory device may comprise floating gate NAND memory cells at box 38, CTF NAND memory cells at box 39, etc.

Embodiments of the method 25 may be implemented in a system, apparatus, computer, device, etc., for example, such as those described herein. More particularly, hardware implementations may include configurable logic (e.g., suitably configured PLAs, FPGAs, CPLDs, general purpose microprocessors, etc.), fixed-functionality logic (e.g., suitably configured ASICs, combinational logic circuits, sequential logic circuits, etc.), or any combination thereof. Hybrid hardware implementations include static dynamic System-on-Chip (SoC) re-configurable devices such that control flow, and data paths implement logic for the functionality. Alternatively, or additionally, the method 25 may be implemented in one or more modules as a set of logic instructions stored in a machine- or computer-readable storage medium such as RAM, ROM, PROM, firmware, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C#, VHDL, Verilog, System C or the like and conventional procedural programming languages, such as the "C" programming language or similar programming languages.

For example, the method 25 may be implemented on a computer readable medium. Embodiments or portions of the method 25 may be implemented in firmware, applications (e.g., through an application programming interface (API)), or driver software running on an OS. Additionally, logic instructions might include assembler instructions, instruction set architecture (ISA) instructions, data set architecture (DSA) commands, (machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, Moore Machine, Mealy Machine, etc.).

3D NAND flash density is increased as a number of NAND memory tiers is increased with some advanced memory technologies. Some NAND memory devices may have two or four planes with separated array operations. In some NAND flash memory devices, a multi-plane read operation across planes may be a dependent synchronous operation. A problem is that when reading different types of memory cells across planes, such as single-level cell (SLC) and triple-level cell (TLC) combined read or SLC and quad-level cell (QLC) combined read, the dependent synchronous read operation may make the read operation too slow. In some NAND flash memory devices, to improve read performance, an asynchronous plane read operation may be used. A problem with such asynchronous read operation in some NAND flash memory devices is noise interaction. During a sense period of a plane, another plane's Vpass voltage swing or any other operation such as a page buffer latch logic operation may cause a noise that affects the sense operation of a plane. As a result of the noise, a cell threshold voltage (Vt) of the sense reading plane may be read-out incorrectly that may make the page data bits failure.

To reduce or avoid the noise interaction, some NAND flash memory device may utilize power and ground separation for an asynchronous plane read operation, where each memory plane has its own supply source of Vpass voltage, selected word line voltage and page buffer power source. In some NAND memory devices, asynchronous independent multi-plane read operations involves independent execution of read operations in each plane. Sense related circuits and power supplies connected to each sense circuit need to be separated to not interfere with each plane's read operation. A problem is that the separate power sources and read control circuits to reduce the noise interaction increase the circuit area and die area of the memory device. Some embodiments may overcome one or more of the foregoing problems.

In some embodiments, sense read operations are aligned between two or more planes to avoid noise interaction between the sense read operations in each plane. The read time (tR) may increase slightly as compared to asynchronous full independent multi-plane read operations, but the circuit design is much simpler and utilizes less die size.

Figure 4:
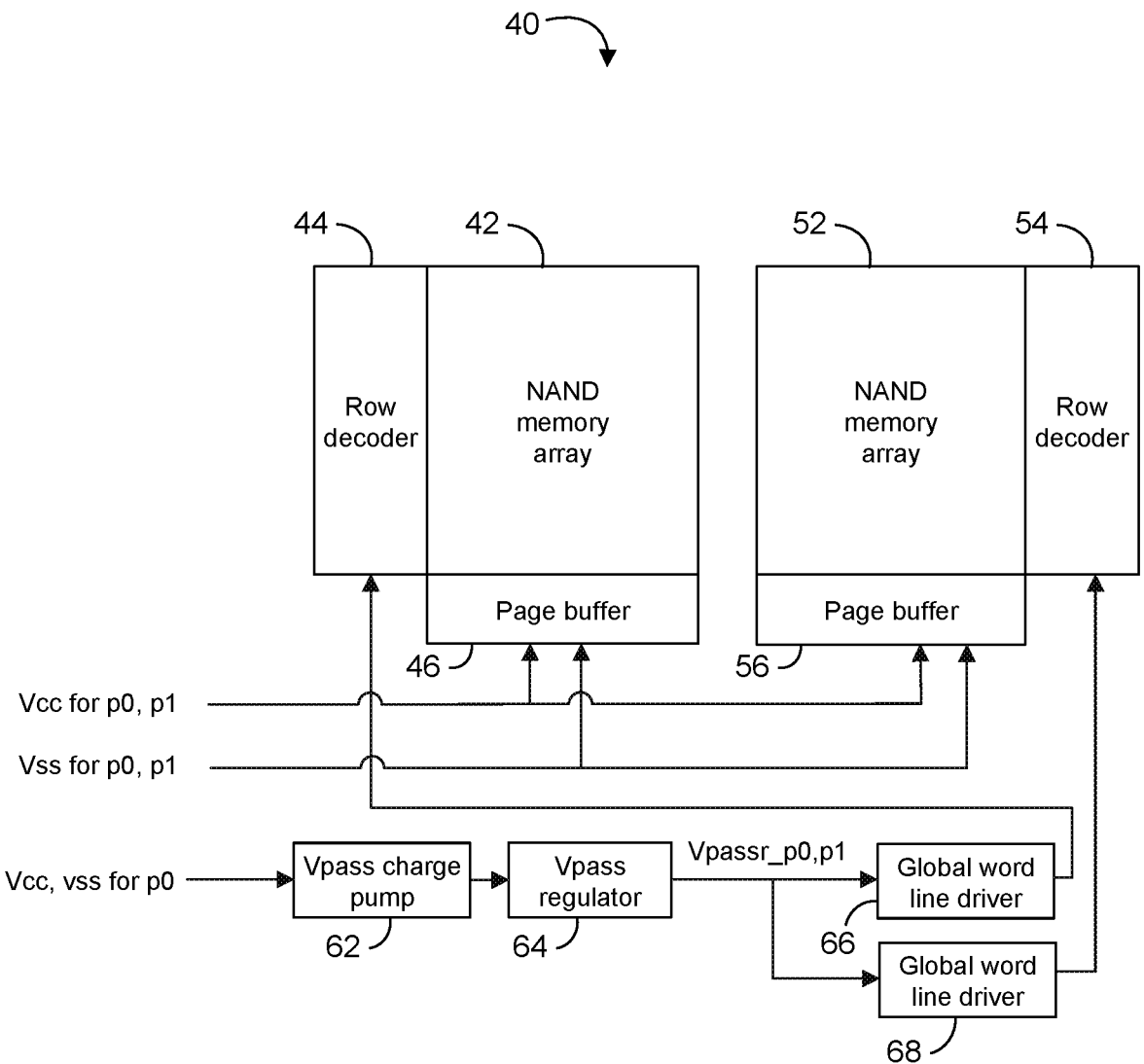
FIG. 4 is a block diagram of an example of a multi-plane NAND memory device according to an embodiment.

With reference to FIG. 4, an embodiment of a multi-plane NAND memory device 40 includes a NAND memory array 42 that corresponds to plane p0 of the device 40 and another NAND memory array 52 that corresponds to plane p1 of the device 40. Each array 42 and 52 has a respective row decoder 44 and 54 and page buffer 46 and 56 associated with the respective planes p0 and p1. As shown in FIG. 4, the same Vcc and Vss power signals are provided to the page buffer 46 associated with the plane p0 and the page buffer 56 associated with the plane p1 (e.g., no structural power isolation). A single charge pump circuit 62 and a single voltage regulator circuit 64 provide a shared regulated pass voltage (Vpass_p0,p1) to respective global word line driver circuits 66 and 68 (coupled to row decoders 44 and 54, respectively).

With suitable control circuitry for the device 40, sense read operations between the memory planes p0 and p1 are aligned to avoid noise interaction between the sense read operations in each plane. Advantageously, separate power and ground planes are not needed for noise isolation and fewer power supply circuits are utilized for the sense read operations (e.g., one charge pump and voltage regulator for two or more memory planes, instead of separate charge pumps and voltage regulators for each plane).

With reference to FIGS. 5A to 5D, in example timing sequences for read operations on two planes p0, p1 of a multi-plane NAND memory device, a page read command indicates a page address and a plane address. In response to the page read command, a controller may perform a pre-read operation on the indicated plane, followed by two sense read operations on the indicated plane, followed by a read discharge operation on the indicated plane. In some devices, the pre-read operation removes electrons/holes from the floated channel body.

Figure 5A:
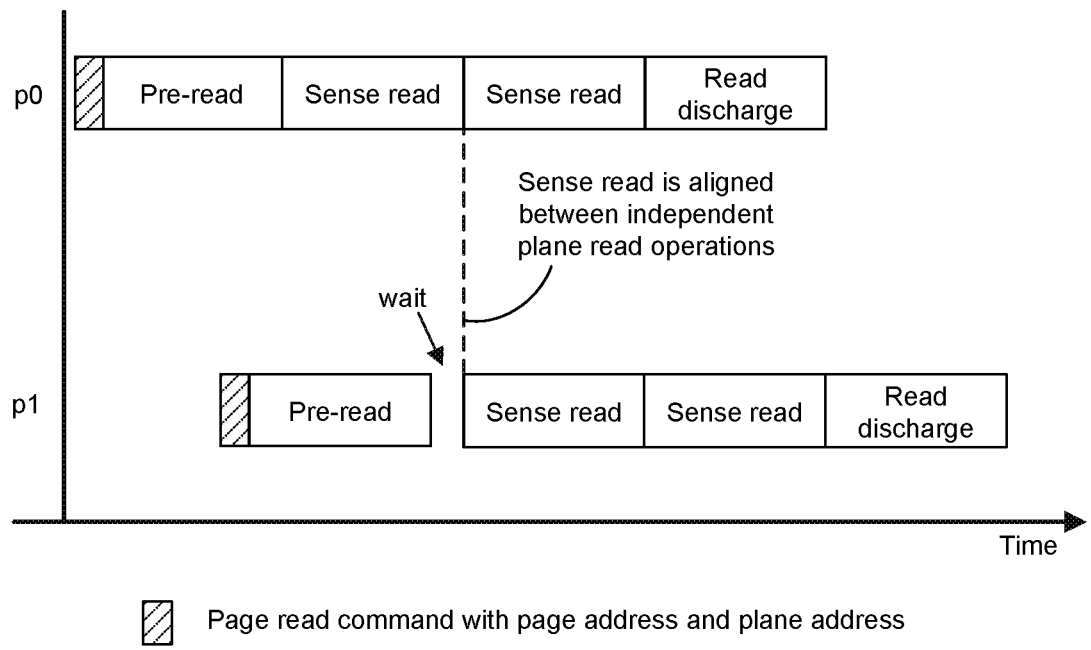
FIGS. 5A to 5D are illustrative diagram of examples of timing of read operations for a multi-plane NAND memory device according to an embodiment.

In FIG. 5A, a page read for plane p1 occurs in a time period of a pre-read operation on plane p0. The pre-read operation can start on plane p1 without interfering with the sense read operation that follows the pre-read operation on plane p0. A time period of the pre-read operation on plane p1 completes during the first sense read operation on plane p0. Instead of immediately performing the sense read operation on plane p1 following the pre-read operation on plane p1, the sense read operation on plane p1 is aligned with a next read operation on plane p0. As shown in FIG. 5A, the first sense read operation on plane p1 is delayed by a period of wait time to align the first sense read operation on plane p1 with a next sense read operation on plane p0.

Figure 5B:
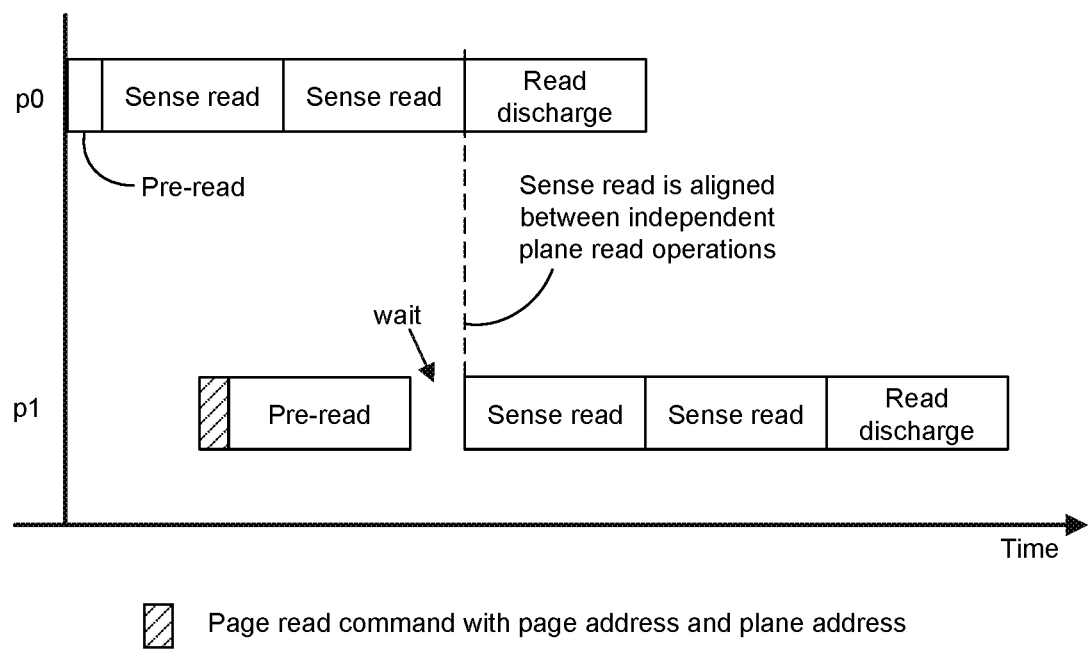

In FIG. 5B, a page read for plane p1 occurs in a time period of a sense read operation on plane p0. The pre-read operation can start on plane p1 without interfering with the sense read operation that follows the in progress sense read operation on plane p0. A time period of the pre-read operation on plane p1 completes during the second sense read operation on plane p0. Instead of immediately performing the sense read operation on plane p1 following the pre-read operation on plane p1, the sense read operation on plane p1 is aligned with a next read operation on plane p0. As shown in FIG. 5B, the first sense read operation on plane p1 is delayed by a period of wait time to align the first sense read operation on plane p1 with a next read discharge operation on plane p0.

Figure 5C:
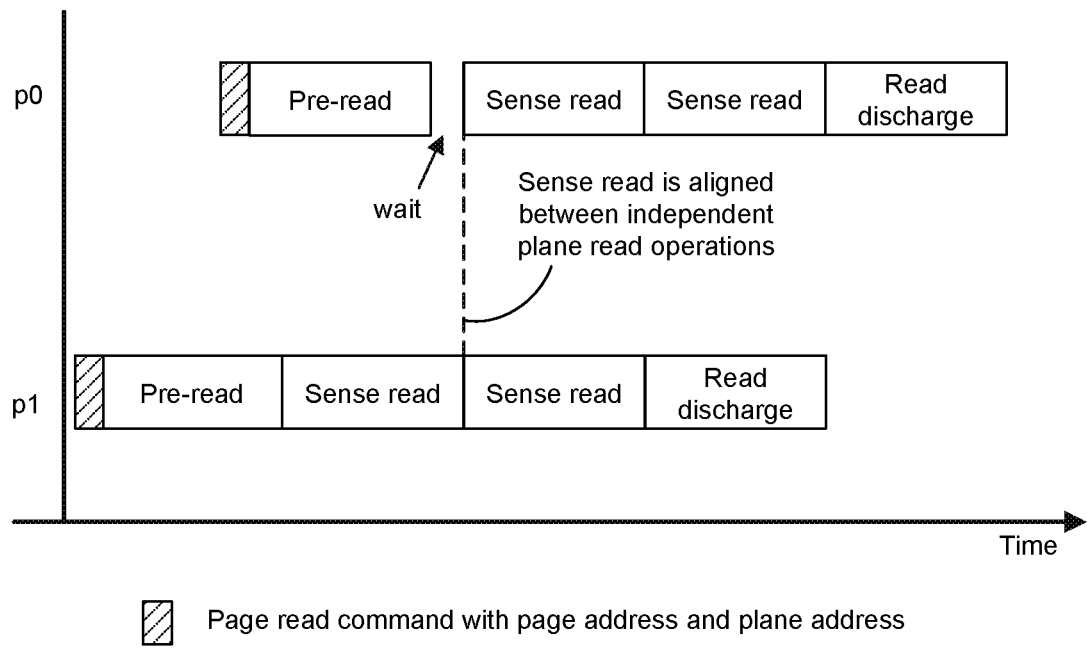

In FIG. 5C, a page read for plane p0 occurs in a time period of a pre-read operation on plane p1. The pre-read operation can start on plane p0 without interfering with the sense read operation that follows the pre-read operation on plane p1. A time period of the pre-read operation on plane p0 completes during the first sense read operation on plane p1. Instead of immediately performing the sense read operation on plane p0 following the pre-read operation on plane p0, the sense read operation on plane p0 is aligned with a next read operation on plane p1. As shown in FIG. 5C, the first sense read operation on plane p0 is delayed by a period of wait time to align the first sense read operation on plane p0 with a next sense read operation on plane p1.

Figure 5D:
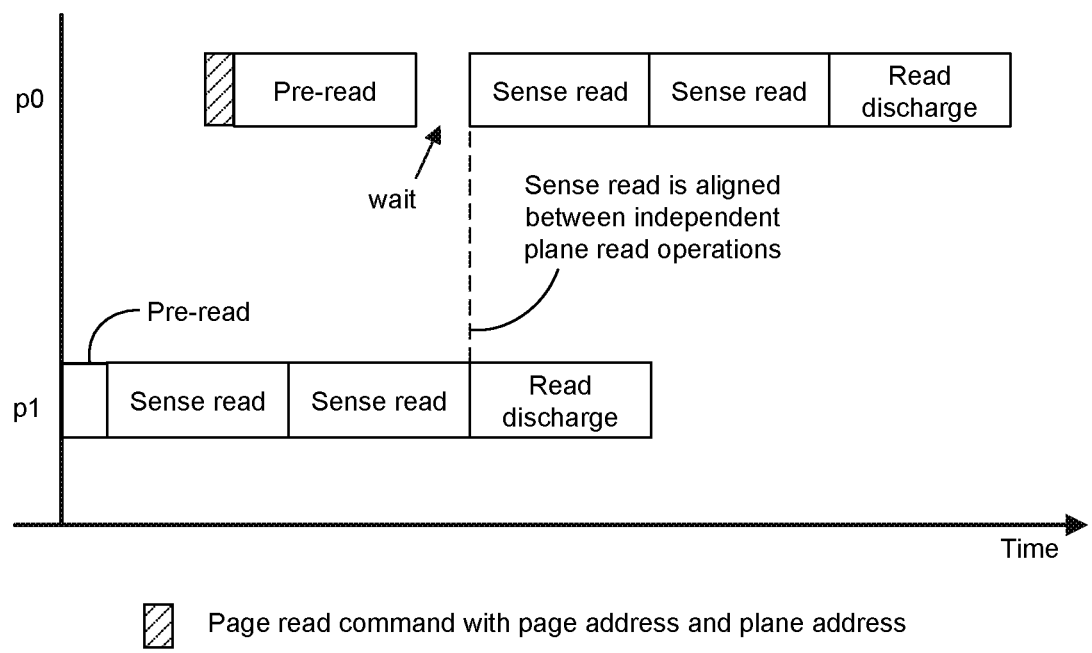

In FIG. 5D, a page read for plane p0 occurs in a time period of a sense read operation on plane p1. The pre-read operation can start on plane p0 without interfering with the sense read operation that follows the in progress sense read operation on plane p1. A time period of the pre-read operation on plane p0 completes during the second sense read operation on plane p1. Instead of immediately performing the sense read operation on plane p0 following the pre-read operation on plane p0, the sense read operation on plane p0 is aligned with a next read operation on plane p1. As shown in FIG. 5D, the first sense read operation on plane p0 is delayed by a period of wait time to align the first sense read operation on plane p0 with a next read discharge operation on plane p1.

Any suitable technology may be utilized to determine appropriate wait times or otherwise align the sense read operations between two or more planes of a multi-plane NAND memory. Given the benefit of the present application, those skilled in the art will further appreciate that other embodiments may be applied to four or more planes with suitable control circuitry to determine appropriate wait times or otherwise align the sense read operations therebetween.

The technology discussed herein may be provided in various computing systems (e.g., including a non-mobile computing device such as a desktop, workstation, server, rack system, etc., a mobile computing device such as a smartphone, tablet, Ultra-Mobile Personal Computer (UMPC), laptop computer, ULTRABOOK computing device, smart watch, smart glasses, smart bracelet, etc., and/or a client/edge device such as an Internet-of-Things (IoT) device (e.g., a sensor, a camera, etc.)).

Figure 6:
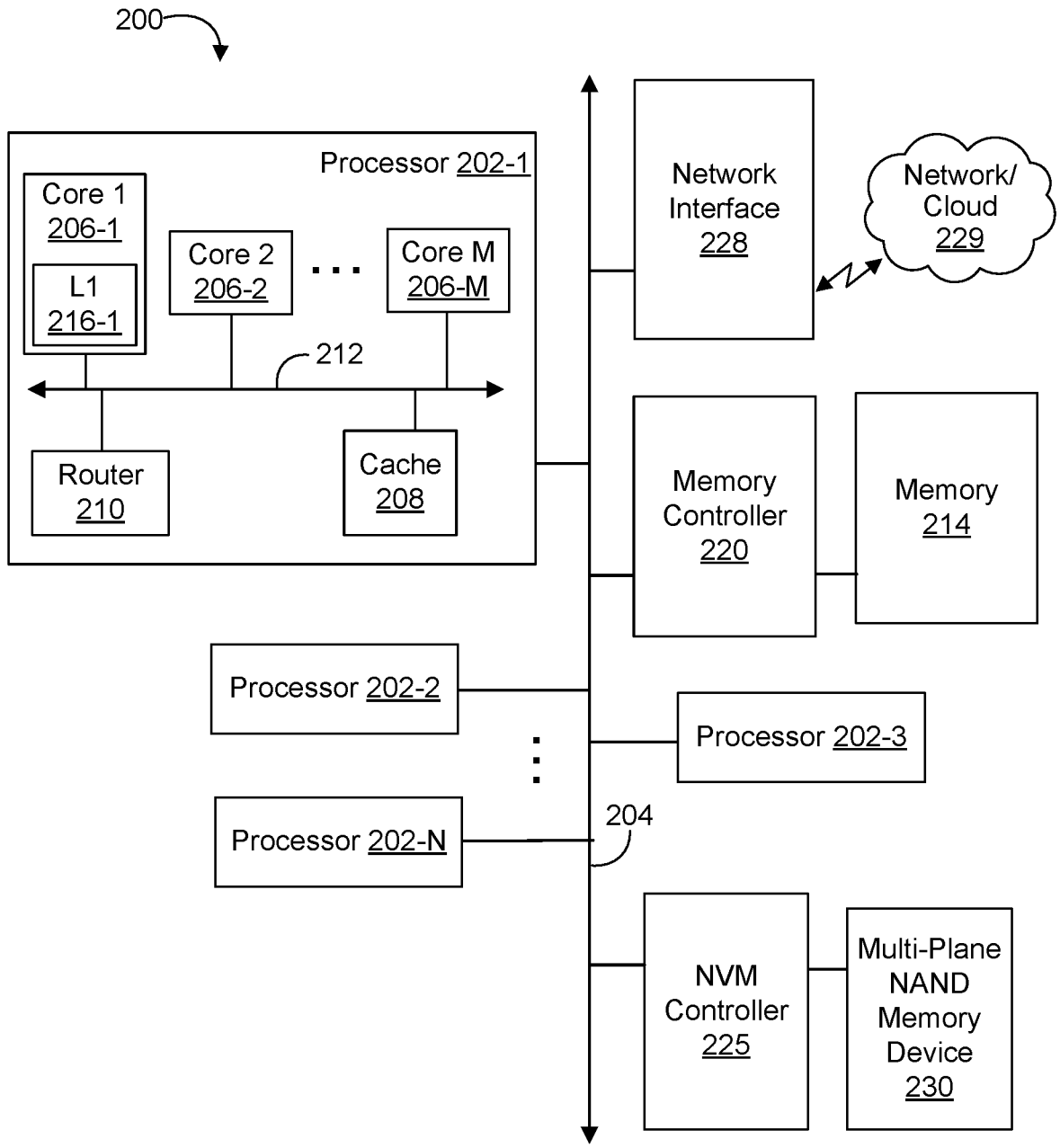
FIG. 6 is a block diagram of an example of a computing system according to an embodiment.

Turning now to FIG. 6, an embodiment of a computing system 200 may include one or more processors 202-1 through 202-N (generally referred to herein as "processors 202" or "processor 202"). The processors 202 may communicate via an interconnection or bus 204. Each processor 202 may include various components some of which are only discussed with reference to processor 202-1 for clarity. Accordingly, each of the remaining processors 202-2 through 202-N may include the same or similar components discussed with reference to the processor 202-1.

In some embodiments, the processor 202-1 may include one or more processor cores 206-1 through 206-M (referred to herein as "cores 206," or more generally as "core 206"), a cache 208 (which may be a shared cache or a private cache in various embodiments), and/or a router 210. The processor cores 206 may be implemented on a single integrated circuit (IC) chip. Moreover, the chip may include one or more shared and/or private caches (such as cache 208), buses or interconnections (such as a bus or interconnection 212), memory controllers, or other components.

In some embodiments, the router 210 may be used to communicate between various components of the processor 202-1 and/or system 200. Moreover, the processor 202-1 may include more than one router 210. Furthermore, the multitude of routers 210 may be in communication to enable data routing between various components inside or outside of the processor 202-1.

The cache 208 may store data (e.g., including instructions) that is utilized by one or more components of the processor 202-1, such as the cores 206. For example, the cache 208 may locally cache data stored in a memory 214 for faster access by the components of the processor 202. As shown in FIG. 6, the memory 214 may be in communication with the processors 202 via the interconnection 204. In some embodiments, the cache 208 (that may be shared) may have various levels, for example, the cache 208 may be a mid-level cache and/or a last-level cache (LLC). Also, each of the cores 206 may include a level 1 (L1) cache (216-1) (generally referred to herein as "L1 cache 216"). Various components of the processor 202-1 may communicate with the cache 208 directly, through a bus (e.g., the bus 212), and/or a memory controller or hub.

As shown in FIG. 6, memory 214 may be coupled to other components of system 200 through a memory controller 220. Memory 214 may include volatile memory and may be interchangeably referred to as main memory or system memory. Even though the memory controller 220 is shown to be coupled between the interconnection 204 and the memory 214, the memory controller 220 may be located elsewhere in system 200. For example, memory controller 220 or portions of it may be provided within one of the processors 202 in some embodiments. Alternatively, memory 214 may include byte-addressable non-volatile memory such as INTEL OPTANE technology.

The system 200 may communicate with other devices/systems/networks via a network interface 228 (e.g., which is in communication with a computer network and/or the cloud 229 via a wired or wireless interface). For example, the network interface 228 may include an antenna (not shown) to wirelessly (e.g., via an Institute of Electrical and Electronics Engineers (IEEE) 802.11 interface (including IEEE 802.11a/b/g/n/ac, etc.), cellular interface, 3G, 4G, LTE, BLUETOOTH, etc.) communicate with the network/cloud 229.

System 200 may also include NAND memory such as a multi-plane NAND memory device 230 coupled to the interconnect 204 via NVM controller 225. Hence, NVM controller 225 may control access by various components of system 200 to the multi-plane NAND memory device 230. Furthermore, even though NVM controller 225 is shown to be directly coupled to the interconnection 204 in FIG. 6, NVM controller 225 can alternatively communicate via a memory/storage bus/interconnect (such as the SATA (Serial Advanced Technology Attachment) bus, Peripheral Component Interconnect (PCI) (or PCI EXPRESS (PCIe) interface), NVM EXPRESS (NVMe), Serial Attached SCSI (SAS), Fiber Channel, etc.) with one or more other components of system 200 (for example where the memory bus is coupled to interconnect 204 via some other logic like a bus bridge, chipset, etc.) Additionally, NVM controller 225 may be incorporated into memory controller logic or provided on a same integrated circuit (IC) device in various embodiments (e.g., on the same circuit board device as the multi-plane NAND memory device 230 or in the same enclosure as the multi-plane NAND memory device 230).

Furthermore, NVM controller 225 and/or multi-plane NAND memory device 230 may be coupled to one or more sensors (not shown) to receive information (e.g., in the form of one or more bits or signals) to indicate the status of or values detected by the one or more sensors. These sensor(s) may be provided proximate to components of system 200 (or other computing systems discussed herein), including the cores 206, interconnections 204 or 212, components outside of the processor 202, multi-plane NAND memory device 230, SSD bus, SATA bus, NVM controller 225, etc., to sense variations in various factors affecting power/thermal behavior of the system/platform, such as temperature, operating frequency, operating voltage, power consumption, and/or inter-core communication activity, etc.

Figure 7:
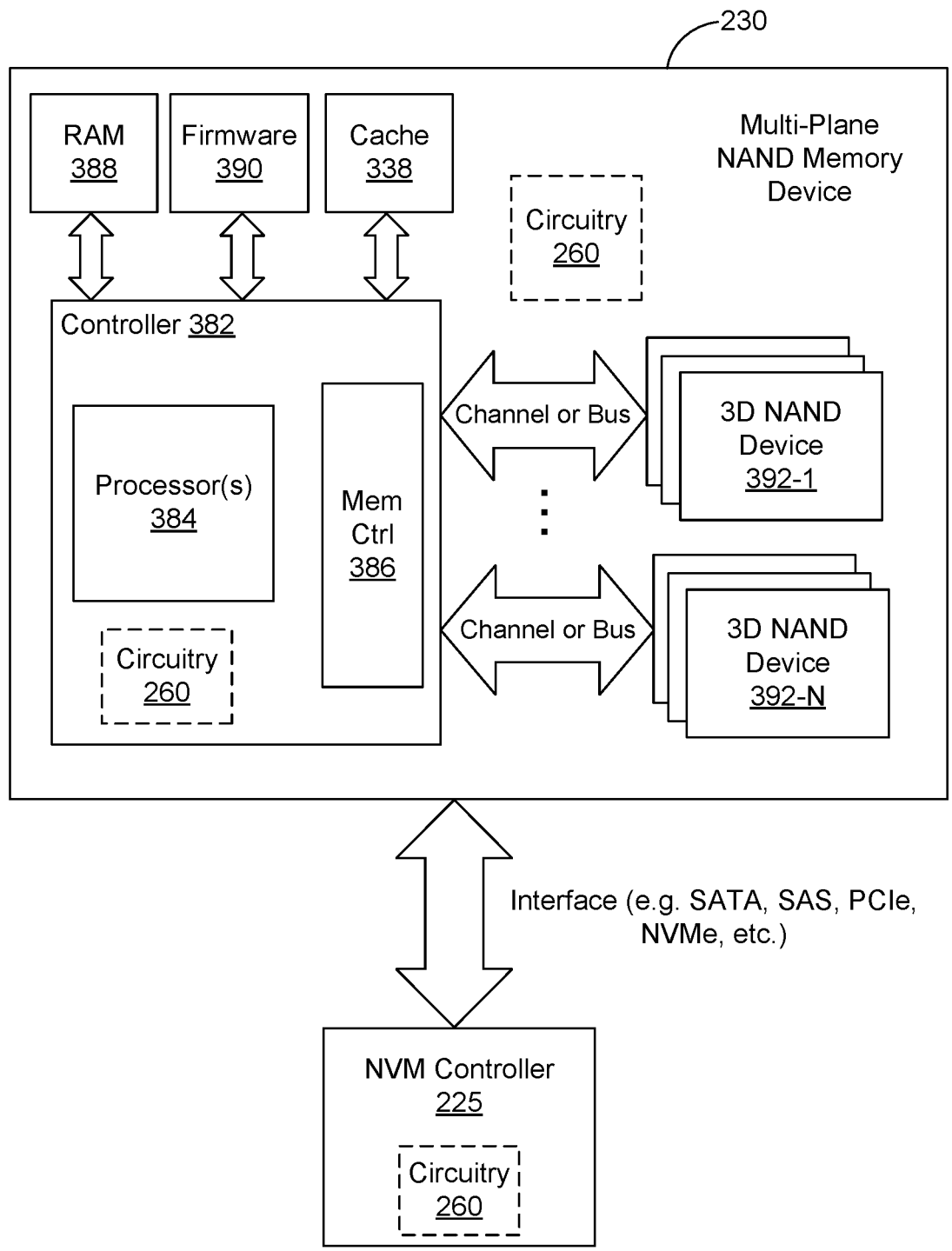
FIG. 7 is a block diagram of an example of a multi-plane NAND memory device according to an embodiment.

FIG. 7 illustrates a block diagram of various components of the device 230, according to an embodiment. As illustrated in FIG. 7, circuitry 260 may be located in various locations such as inside the device 230 or NVM controller 225. The device 230 includes a controller 382 (which in turn includes one or more processor cores or processors 384 and memory controller logic 386), cache 338, RAM 388, firmware storage 390, and one or more multi-plane NAND memory dice 392-1 to 392-N (collectively multi-plane NAND media 392). The multi-plane NAND media 392 is coupled to the memory controller logic 386 via one or more memory channels or busses. Also, device 230 communicates with NVM controller 225 via an interface (such as a SATA, SAS, PCIe, NVMe, etc., interface). Processors 384 and/or controller 382 may compress/decompress data written to or read from multi-plane NAND memory dice 392-1 to 392-N.

As illustrated in FIG. 7, the device 230 may include circuitry 260, which may be in the same enclosure as the device 230 and/or fully integrated on a printed circuit board (PCB) of the device 230. One or more of the features/ aspects/operations discussed with reference to FIGS. 1-5D may be performed by one or more of the components of FIG. 7. Also, one or more of the features/aspects/ operations of FIGS. 1-5D may be programmed into the firmware 390. Further, NVM controller 225 may also include circuitry 260. Advantageously, the circuitry 260 may include technology to implement one or more aspects of the apparatus 10 (FIG. 1), the system 20 (FIG. 2), the method 25 (FIGS. 3A to 3B), the device 40 (FIG. 4), the example read operations (FIGS. 5A to 5D), and/or any of the features discussed herein.

For example, the circuitry 260 may be configured to provide synchronous independent plane read operations for the multi-plane NAND memory device 230. In some embodiments, the circuitry 260 may be configured to perform a sense read operation on a first plane of the multi-plane NAND memory device 230, and delay a subsequent sense read operation on a second plane of the multi-plane NAND memory device 230 if the sense read operation is in progress on the first plane. For example, the circuitry 260 may be configured to delay the subsequent sense read operation on the second plane to align the subsequent sense read operation with a next read operation on the first plane after the sense read operation on the first plane is completed. In some embodiments, the circuitry 260 may be additionally or alternatively configured to perform a pre-read operation on the second plane of the multi-plane NAND memory device 230 in response to a page read command for the second plane, and to delay the subsequent sense read operation on the second plane for a period of time after the pre-read operation that aligns the subsequent sense read operation on the second plane with a next read of operation on the first plane if the sense read operation on the first place is in progress on the first plane after the pre-read operation on the second plane is completed.

In some embodiments, the multi-plane NAND memory device 230 may further include one or more of a single charge pump circuit shared between at least two memory planes of the multi-plane NAND memory device 230, a single voltage regulator circuit shared between at least two memory planes of the multi-plane NAND memory device 230, a single power plane coupled to at least a first page buffer of a first memory plane of the multi-plane NAND memory device 230 and a second page buffer of a second memory plane of the multi-plane NAND memory device 230, and a single ground plane coupled to at least a first page buffer of a first memory plane of the multi-plane NAND memory device 230 and a second page buffer of a second memory plane of the multi-plane NAND memory device 230. For example, the multi-plane NAND media 392 may comprise 3D NAND memory cells, such as floating gate NAND memory cells, CTF NAND memory cells. etc.

Those skilled in the art will appreciate that a wide variety of devices may benefit from the foregoing embodiments. The following exemplary core architectures, processors, and computer architectures are non-limiting examples of devices that may beneficially incorporate embodiments of the technology described herein.

Additional Notes and Examples

Example 1 includes an apparatus, comprising NAND memory organized as two or more memory planes, and a controller communicatively coupled to the NAND memory, the controller including circuitry to provide synchronous independent plane read operations for the two or more memory planes of the NAND memory.

Example 2 includes the apparatus of Example 1, wherein the circuitry is further to perform a sense read operation on a first plane of the two or more memory planes of the NAND memory, and delay a subsequent sense read operation on a second plane of the two or more memory planes of the NAND memory if the sense read operation is in progress on the first plane.

Example 3 includes the apparatus of Example 2, wherein the circuitry is further to delay the subsequent sense read operation on the second plane to align the subsequent sense read operation with a next read operation on the first plane after the sense read operation on the first plane is completed.

Example 4 includes the apparatus of any of Examples 2 to 3, wherein the circuitry is further to perform a pre-read operation on the second plane of the two or more memory planes of the NAND memory in response to a page read command for the second plane, and delay the subsequent sense read operation on the second plane for a period of time after the pre-read operation that aligns the subsequent sense read operation on the second plane with a next read of operation on the first plane if the sense read operation on the first place is in progress on the first plane after the pre-read operation on the second plane is completed.

Example 5 includes the apparatus of any of Examples 1 to 4, further comprising a single charge pump circuit shared between at least two memory planes of the two or more memory planes of the NAND memory.

Example 6 includes the apparatus of any of Examples 1 to 5, further comprising a single voltage regulator circuit shared between at least two memory planes of the two or more memory planes of the NAND memory.

Example 7 includes the apparatus of any of Examples 1 to 6, further comprising a single power plane coupled to at least a first page buffer of a first memory plane of the two or more memory planes of the NAND memory and a second page buffer of a second memory plane of the two or more memory planes of the NAND memory.

Example 8 includes the apparatus of any of Examples 1 to 7, further comprising a single ground plane coupled to at least a first page buffer of a first memory plane of the two or more memory planes of the NAND memory and a second page buffer of a second memory plane of the two or more memory planes of the NAND memory.

Example 9 includes the apparatus of any of Examples 1 to 8, wherein the NAND memory comprises three-dimensional (3D) NAND memory cells.

Example 10 includes a system, comprising a processor, and a multi-plane NAND memory device, and a controller communicatively coupled to the processor and the multi-plane NAND memory device, the controller including circuitry to provide synchronous independent plane read operations for the multi-plane NAND memory device.

Example 11 includes the system of Example 10, wherein the circuitry is further to perform a sense read operation on a first plane of the multi-plane NAND memory device, and delay a subsequent sense read operation on a second plane of the multi-plane NAND memory device if the sense read operation is in progress on the first plane.

Example 12 includes the system of Example 11, wherein the circuitry is further to delay the subsequent sense read operation on the second plane to align the subsequent sense read operation with a next read operation on the first plane after the sense read operation on the first plane is completed.

Example 13 includes the system of any of Examples 11 to 12, wherein the circuitry is further to perform a pre-read operation on the second plane of the multi-plane NAND memory device in response to a page read command for the second plane, and delay the subsequent sense read operation on the second plane for a period of time after the pre-read operation that aligns the subsequent sense read operation on the second plane with a next read of operation on the first plane if the sense read operation on the first place is in progress on the first plane after the pre-read operation on the second plane is completed.

Example 14 includes the system of any of Examples 10 to 13, wherein the multi-plane NAND memory device further comprises a single charge pump circuit shared between at least two memory planes of the multi-plane NAND memory device.

Example 15 includes the system of any of Examples 10 to 14, wherein the multi-plane NAND memory device further comprises a single voltage regulator circuit shared between at least two memory planes of the multi-plane NAND memory device.

Example 16 includes the system of any of Examples 10 to 15, wherein the multi-plane NAND memory device further comprises a single power plane coupled to at least a first page buffer of a first memory plane of the multi-plane NAND memory device and a second page buffer of a second memory plane of the multi-plane NAND memory device.

Example 17 includes the system of any of Examples 10 to 16, wherein the multi-plane NAND memory device further comprises a single ground plane coupled to at least a first page buffer of a first memory plane of the multi-plane NAND memory device and a second page buffer of a second memory plane of the multi-plane NAND memory device.

Example 18 includes the system of any of Examples 10 to 17, wherein the multi-plane NAND memory device comprises three-dimensional (3D) NAND memory cells.

Example 19 includes the system of Example 18, wherein the 3D NAND memory cells comprise floating gate NAND memory cells.

Example 20 includes the system of Example 18, wherein the 3D NAND memory cells comprise charge trap flash NAND memory cells.

Example 21 includes the system of any of Examples 10 to 20, wherein the system comprises a mobile computing device and further includes at least one of a display communicatively coupled to the processor and a battery coupled to the processor.

Example 22 includes a method, comprising controlling access to a multi-plane NAND memory device, and providing synchronous independent plane read operations for the multi-plane NAND memory device.

Example 23 includes the method of Example 22, further comprising performing a sense read operation on a first plane of the multi-plane NAND memory device, and delaying a subsequent sense read operation on a second plane of the multi-plane NAND memory device if the sense read operation is in progress on the first plane.

Example 24 includes the method of Example 23, further comprising delaying the subsequent sense read operation on the second plane to align the subsequent sense read operation with a next read operation on the first plane after the sense read operation on the first plane is completed.

Example 25 includes the method of any of Examples 23 to 24, further comprising performing a pre-read operation on the second plane of the multi-plane NAND memory device in response to a page read command for the second plane, and delaying the subsequent sense read operation on the second plane for a period of time after the pre-read operation that aligns the subsequent sense read operation on the second plane with a next read of operation on the first plane if the sense read operation on the first place is in progress on the first plane after the pre-read operation on the second plane is completed.

Example 26 includes the method of any of Examples 22 to 25, further comprising sharing a single charge pump circuit between at least two memory planes of the multi-plane NAND memory device.

Example 27 includes the method of any of Examples 22 to 26, further comprising sharing a single voltage regulator circuit between at least two memory planes of the multi-plane NAND memory device.

Example 28 includes the method of any of Examples 22 to 27, further comprising coupling a single power plane to at least a first page buffer of a first memory plane of the multi-plane NAND memory device and a second page buffer of a second memory plane of the multi-plane NAND memory device.

Example 29 includes the method of any of Examples 22 to 28, further comprising coupling a single ground plane to at least a first page buffer of a first memory plane of the multi-plane NAND memory device and a second page buffer of a second memory plane of the multi-plane NAND memory device.

Example 30 includes the method of any of Examples 22 to 29, wherein the multi-plane NAND memory device comprises three-dimensional (3D) NAND memory cells.

Example 31 includes the method of Example 30, wherein the 3D NAND memory cells comprise floating gate NAND memory cells.

Example 32 includes the method of Example 30, wherein the 3D NAND memory cells comprise charge trap flash NAND memory cells.

Example 33 includes at least one non-transitory one machine readable medium comprising a plurality of instructions that, in response to being executed on a computing device, cause the computing device to control access to a multi-plane NAND memory device, and provide synchronous independent plane read operations for the multi-plane NAND memory device.

Example 34 includes the at least one non-transitory one machine readable medium of Example 33, comprising a plurality of further instructions that, in response to being executed on the computing device, cause the computing device to perform a sense read operation on a first plane of the multi-plane NAND memory device, and delay a subsequent sense read operation on a second plane of the multi-plane NAND memory device if the sense read operation is in progress on the first plane.

Example 35 includes the at least one non-transitory one machine readable medium of Example 34, comprising a plurality of further instructions that, in response to being executed on the computing device, cause the computing device to delay the subsequent sense read operation on the second plane to align the subsequent sense read operation with a next read operation on the first plane after the sense read operation on the first plane is completed.

Example 36 includes the at least one non-transitory one machine readable medium of any of Examples 34 to 35, comprising a plurality of further instructions that, in response to being executed on the computing device, cause the computing device to perform a pre-read operation on the second plane of the multi-plane NAND memory device in response to a page read command for the second plane, and delay the subsequent sense read operation on the second plane for a period of time after the pre-read operation that aligns the subsequent sense read operation on the second plane with a next read of operation on the first plane if the sense read operation on the first place is in progress on the first plane after the pre-read operation on the second plane is completed.

Example 37 includes an apparatus, comprising means for controlling access to a multi-plane NAND memory device, and means for providing synchronous independent plane read operations for the multi-plane NAND memory device.

Example 38 includes the apparatus of Example 37, further comprising means for performing a sense read operation on a first plane of the multi-plane NAND memory device, and means for delaying a subsequent sense read operation on a second plane of the multi-plane NAND memory device if the sense read operation is in progress on the first plane.

Example 39 includes the apparatus of Example 38, further comprising means for delaying the subsequent sense read operation on the second plane to align the subsequent sense read operation with a next read operation on the first plane after the sense read operation on the first plane is completed.

Example 40 includes the apparatus of any of Examples 38 to 39, further comprising means for performing a pre-read operation on the second plane of the multi-plane NAND memory device in response to a page read command for the second plane, and means for delaying the subsequent sense read operation on the second plane for a period of time after the pre-read operation that aligns the subsequent sense read operation on the second plane with a next read of operation on the first plane if the sense read operation on the first place is in progress on the first plane after the pre-read operation on the second plane is completed.

Example 41 includes the apparatus of any of Examples 37 to 40, further comprising means for sharing a single charge pump circuit between at least two memory planes of the multi-plane NAND memory device.

Example 42 includes the apparatus of any of Examples 37 to 41, further comprising means for sharing a single voltage regulator circuit between at least two memory planes of the multi-plane NAND memory device.

Example 43 includes the apparatus of any of Examples 37 to 42, further comprising means for coupling a single power plane to at least a first page buffer of a first memory plane of the multi-plane NAND memory device and a second page buffer of a second memory plane of the multi-plane NAND memory device.

Example 44 includes the apparatus of any of Examples 37 to 43, further comprising means for coupling a single ground plane to at least a first page buffer of a first memory plane of the multi-plane NAND memory device and a second page buffer of a second memory plane of the multi-plane NAND memory device.

Example 45 includes the apparatus of any of Examples 37 to 44, wherein the multi-plane NAND memory device comprises three-dimensional (3D) NAND memory cells.

Example 46 includes the apparatus of Example 45, wherein the 3D NAND memory cells comprise floating gate NAND memory cells.

Example 47 includes the apparatus of Example 45, wherein the 3D NAND memory cells comprise charge trap flash NAND memory cells.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C. Various components of the systems described herein may be implemented in software, firmware, and/or hardware and/or any combination thereof. For example, various components of the systems or devices discussed herein may be provided, at least in part, by hardware of a computing SoC such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. An apparatus, comprising:
   NAND memory having two or more memory planes including a first memory plane and a second memory plane; and
   a controller communicatively coupled to the NAND memory, the controller including circuitry configured to:
      perform a sequence of successive read operations on the first memory plane;
      perform a pre-read operation and a subsequent sense read operation on the second memory plane; and
      provide synchronous independent plane read operations for the two or more memory planes of the NAND memory, including:
         completing the pre-read operation, while a sense read operation of the sequence of successive read operation is implemented on the first memory plane; and
         after performing the pre-read operation on the second memory plane, delaying the subsequent sense read operation on the second memory plane to align the subsequent sense read operation on the second memory plane with a next read operation that immediately follows the sense read operation in the sequence of successive read operations.

2. The apparatus of claim 1, wherein the circuitry is further configured to:
   delay the subsequent sense read operation on the second memory plane, when the sense read operation is in progress on the first memory plane.

3. The apparatus of claim 1, wherein the circuitry is configured to:
   perform the pre-read operation on the second memory plane of the two or more memory planes of the NAND memory in response to a page read command for the second memory plane.

4. The apparatus of claim 1, further comprising:
   a single charge pump circuit shared between at least two memory planes of the two or more memory planes of the NAND memory.

5. The apparatus of claim 1, further comprising:
   a single voltage regulator circuit shared between at least two memory planes of the two or more memory planes of the NAND memory.

6. The apparatus of claim 5, further comprising:
   two distinct word line drivers coupled to the single voltage regulator circuit, each word line driver further coupled to a respective one of the first memory plane and the second memory plane, the two distinct word line drivers configured to receive a shared regulated pass voltage from the single voltage regulator circuit and drive the first memory plane and the second memory plane separately.

7. The apparatus of claim 1, further comprising:
   a single power plane coupled to at least a first page buffer of a first memory plane of the two or more memory planes of the NAND memory and a second page buffer of a second memory plane of the two or more memory planes of the NAND memory.

8. The apparatus of claim 1, further comprising:
   a single ground plane coupled to at least a first page buffer of a first memory plane of the two or more memory planes of the NAND memory and a second page buffer of a second memory plane of the two or more memory planes of the NAND memory.

9. The apparatus of claim 1, wherein the pre-read operation is configured to remove a set of charge carriers from a floated channel body of the second memory plane.

10. A system, comprising:
    a processor; and
    a multi-plane NAND memory device including a first memory plane and a second memory plane; and
    a controller communicatively coupled to the processor and the multi-plane NAND memory device, the controller including circuitry configured to:
       perform a sequence of successive read operations on the first memory plane;
       perform a pre-read operation and a subsequent sense read operation on the second memory plane; and provide synchronous independent plane read operations for the multi-plane NAND memory device, including:
completing the pre-read operation, while a sense read operation of the sequence of successive read operations is implemented on the first memory plane; and
after performing the pre-read operation on the second memory plane, delaying the subsequent sense read operation on the second memory plane to align the subsequent sense read operation on the second memory plane with a next read operation that immediately follows the sense read operation in the sequence of successive read operations.

11. The system of claim 10, wherein the circuitry is further configured to delay the subsequent sense read operation on the memory second plane of the multi-plane NAND memory device when the sense read operation is in progress on the first memory plane.

12. The system of claim 11, wherein the multi-plane NAND memory device comprises three-dimensional NAND memory cells.

13. The system of claim 10, wherein the circuitry is configured to perform the pre-read operation on the second memory plane of the multi-plane NAND memory device in response to a page read command for the second memory plane.

14. The system of claim 10, wherein the multi-plane NAND memory device further comprises:
a single charge pump circuit shared between at least two memory planes of the multi-plane NAND memory device.

15. The system of claim 10, wherein the multi-plane NAND memory device further comprises:
a single voltage regulator circuit shared between at least two memory planes of the multi-plane NAND memory device.

16. The system of claim 10, wherein the multi-plane NAND memory device further comprises:
a single power plane coupled to at least a first page buffer of a first memory plane of the multi-plane NAND memory device and a second page buffer of a second memory plane of the multi-plane NAND memory device.

17. A method, comprising:
controlling access to a multi-plane NAND memory device including a first memory plane and a second memory plane;
performing a sequence of successive read operations on the first memory plane;
performing a pre-read operation and a subsequent sense read operation on the second memory plane; and
providing synchronous independent plane read operations for the multi-plane NAND memory device, including:
completing the pre-read operation, while a sense read operation of the sequence of successive read operations is implemented on the first memory plane; and
after performing the pre-read operation on the second memory plane, delaying the subsequent sense read operation on the second memory plane to align the subsequent sense read operation on the second memory plane with a next read operation that immediately follows the sense read operation in the sequence of successive read operations.

18. The method of claim 17, wherein the next read operation terminates the sequence of successive read operations and includes a read discharge operation, and the subsequent sense read operation performed on the second on the second memory plane is aligned with the read discharge operation on the first memory plane.

19. The method of claim 17, wherein the next read operation is followed with a read discharge operation that terminates the sequence of successive read operations.

20. The method of claim 17, wherein a set of charge carriers is removed from a floated channel body of the second memory plane.

* * * * *